(12) United States Patent
Kamvysselis et al.

(10) Patent No.: US 7,577,957 B1
(45) Date of Patent: Aug. 18, 2009

(54) MULTIPLE JOBS PER DEVICE THAT ARE LINKED VIA A DEVICE RECORD FOR SERVICING BY DIFFERENT ADAPTERS

(75) Inventors: Peter Kamvysselis, Boston, MA (US); Dan Arnon, Boston, MA (US); David Meiri, Boston, MA (US); Mark J. Halstead, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 754 days.

(21) Appl. No.: 09/891,143

(22) Filed: Jun. 25, 2001

Related U.S. Application Data

(63) Continuation-in-part of application No. 09/801,252, filed on Mar. 7, 2001, now Pat. No. 6,553,464.

(60) Provisional application No. 60/273,790, filed on Mar. 4, 2001.

(51) Int. Cl.
   *G06F 9/46* (2006.01)
   *G06F 13/00* (2006.01)
   *G06F 12/00* (2006.01)

(52) U.S. Cl. .................. 718/102; 718/100; 711/162; 707/204

(58) Field of Classification Search ......... 718/100–108; 711/100, 162; 707/204
See application file for complete search history.

(56) References Cited

U.S. PATENT DOCUMENTS

| | | | |
|---|---|---|---|
| 4,104,718 A * | 8/1978 | Poublan et al. ................. 707/8 |
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,900,871 A * | 5/1999 | Atkin et al. .................. 715/866 |
| 6,035,376 A * | 3/2000 | James ........................ 711/145 |
| 6,519,632 B1 * | 2/2003 | Brackett et al. ............. 709/219 |

OTHER PUBLICATIONS

Pending U.S. Appl. No. 09/893,295, filed Jun. 27, 2001, Method and Apparatus for Multi-Sequential Data Operations.
Pending U.S. Appl. No. 09/891,110, filed Jun. 25, 2001, Obtaining Data From a Remote Data Storage Device Using Multiple Jobs per Device on RA.

* cited by examiner

*Primary Examiner*—Van H Nguyen
*Assistant Examiner*—Kenneth Tang
(74) *Attorney, Agent, or Firm*—Muirhead and Saturnelli, LLC

(57) ABSTRACT

Providing multiple jobs for a device associated with a communication device includes providing a plurality of device records, where each of the device records corresponds to a device associated with the communication device, providing a plurality of job records for at least one of the device records, where each of the job records contains at least some information that is also provided in the corresponding one of the device records, and linking the job records and the corresponding device record so that any one of the job records may be accessed by first accessing the corresponding one of the device records. Providing multiple jobs may also include providing one of a plurality of shared pointers in each of the job records and the corresponding one of the device records, where all of the shared pointers point to the corresponding one of the device records. Linking the job records may include providing a forward pointer and a backward pointer for each of the job records. Linking the job records may also include providing a pointer to one of the job records in the corresponding one of the device records.

11 Claims, 15 Drawing Sheets

US 7,577,957 B1

MULTIPLE JOBS PER DEVICE THAT ARE LINKED VIA A DEVICE RECORD FOR SERVICING BY DIFFERENT ADAPTERS

CROSS REFERENCE TO RELATED APPLICATIONS

This application is a continuation-in-part of U.S. patent application Ser. No. 09/801,252 filed on Mar. 7, 2001, now U.S. Pat. No. 6,553,464, issued on Apr. 22, 2003, which is based on U.S. provisional application No. 60/273,790, filed on Mar. 4, 2001.

BACKGROUND OF THE INVENTION

1. Technical Field

This application relates to computer storage devices, and more particularly to communication between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a user may denote a first storage device as a master storage device and a second storage device as a slave storage device. Other incarnations of RDF may be provide a peer to peer relationship between the local and remote storage devices. The interacts directly with the local storage device, but any data changes made to the local storage device are automatically provided to a remote storage device using RDF. The local and remote storage devices may be connected by a data link, such as an ESCON link. The RDF functionality may be facilitated with an RDF adapter (RA) provided at each of the storage devices.

In some instances, it may be desirable for the host to be able to verify that the data stored on the remote storage device is consistent with the data stored on the local storage device. However, doing so may be difficult if there may be no convenient mechanism for the host to efficiently examine data on the remote storage device to compare the local data with the data stored on the remote storage device. Thus, it would be useful to have a mechanism for conveniently obtaining the data from the remote storage device in order to perform the comparison.

SUMMARY OF THE INVENTION

According to the present invention, providing multiple jobs for a device associated with a communication device includes providing a plurality of device records, wherein each of the device records corresponds to a device associated with the communication device, providing a plurality of job records for at least one of the device records, wherein each of the job records contains at least some information that is also provided in the corresponding one of the device records, and linking the job records and the corresponding device record so that any one of the job records may be accessed by first accessing the corresponding one of the device records. Providing multiple jobs may also include providing one of a plurality of shared pointers in each of the job records and the corresponding one of the device records, wherein all of the shared pointers point to the corresponding one of the device records. Linking the job records may include providing a forward pointer and a backward pointer for each of the job records. Linking the job records may also includes providing a pointer to one of the job records in the corresponding one of the device records. At least one of the device records may include a pointer to one of the job records corresponding to an active job. Each of the job records may include information not found in other ones of the job records.

According further to the present invention, facilitating remotely accessing device information, includes creating a plurality of jobs for the device, wherein each of the jobs relates to at least portion of tasks associated with remotely accessing device information, associating the jobs with a device record for the device, and determining a link id for each of the jobs, wherein the link id uniquely identifies I/O operations for the job. Creating a plurality of jobs may include finding a free element on a job record array, obtaining a shared pointer that points to the device record for the device, copying constants from the device record to each of the job records, setting shared variables for each of the job records, initializing job specific data for each of the job records, setting pointers for each of the job records, and incrementing a job counter by one for each of the job records. Finding a free element on a job record array may include determining if a free element exists and, if a free element does not exist, posting an error.

According further to the present invention, a device record that facilitates remotely accessing device information includes an active job pointer field, a job count field, a constants field, a shared pointer, and a shared parameters field. The active job pointer field may point to an active job record corresponding to the device record. The job count field may indicate how many job records correspond to the device record. The shared pointer may point to the device record.

According further to the present invention, a job record that facilitates remotely accessing device information for a device includes an id track table field, a constants field, a shared pointer field, a job specific data field, a forward pointer, and a backward pointer. The forward pointer and the backward pointer may point to other job records that correspond to the device. The shared pointer may point to a device record corresponding to the device.

According further to the present invention, computer software that provides multiple jobs for a device associated with a communication device includes executable code that provides a plurality of device records, where each of the device records corresponds to a device associated with the communication device, executable code that provides a plurality of job records for at least one of the device records, where each of the job records contains at least some information that is also provided in the corresponding one of the device records and executable code that links the job records and the corresponding device record so that any one of the job records may be accessed by first accessing the corresponding one of the device records. The computer software may also include executable code that provides one of a plurality of shared pointers in each of the job records and the corresponding one of the device records, where all of the shared pointers point to the corresponding one of the device records. The executable code that links the job records may include executable code that provides a forward pointer and a backward pointer for each of the job records. The executable code that links the job records may also include executable code that provides a pointer to one of the job records in the corresponding one of the device records. At least one of the device records may includes a pointer to one of the job records corresponding to an active job. Each of the job records may include information not found in other ones of the job records.

According further to the present invention, computer software that facilitates remotely accessing device information includes executable code that creates a plurality of jobs for the device, where each of the jobs relates to at least portion of tasks associated with remotely accessing device information, executable code that associates the jobs with a device record for the device, and executable code that determines a link id for each of the jobs, wherein the link id uniquely identifies I/O operations for the job. The executable code that creates a plurality of jobs may include executable code that finds a free element on a job record array, executable code that obtains a shared pointer that points to the device record for the device, executable code that copies constants from the device record to each of the job records, executable code that sets shared variables for each of the job records, executable code that initializes job specific data for each of the job records, executable code that sets pointers for each of the job records, and executable code that increments a job counter by one for each of the job records. The executable code that finds a free element on a job record array may include executable code that determines if a free element exists and executable code that posts an error if a free element does not exist.

DETAILED DESCRIPTION OF VARIOUS EMBODIMENTS

Figure 1:
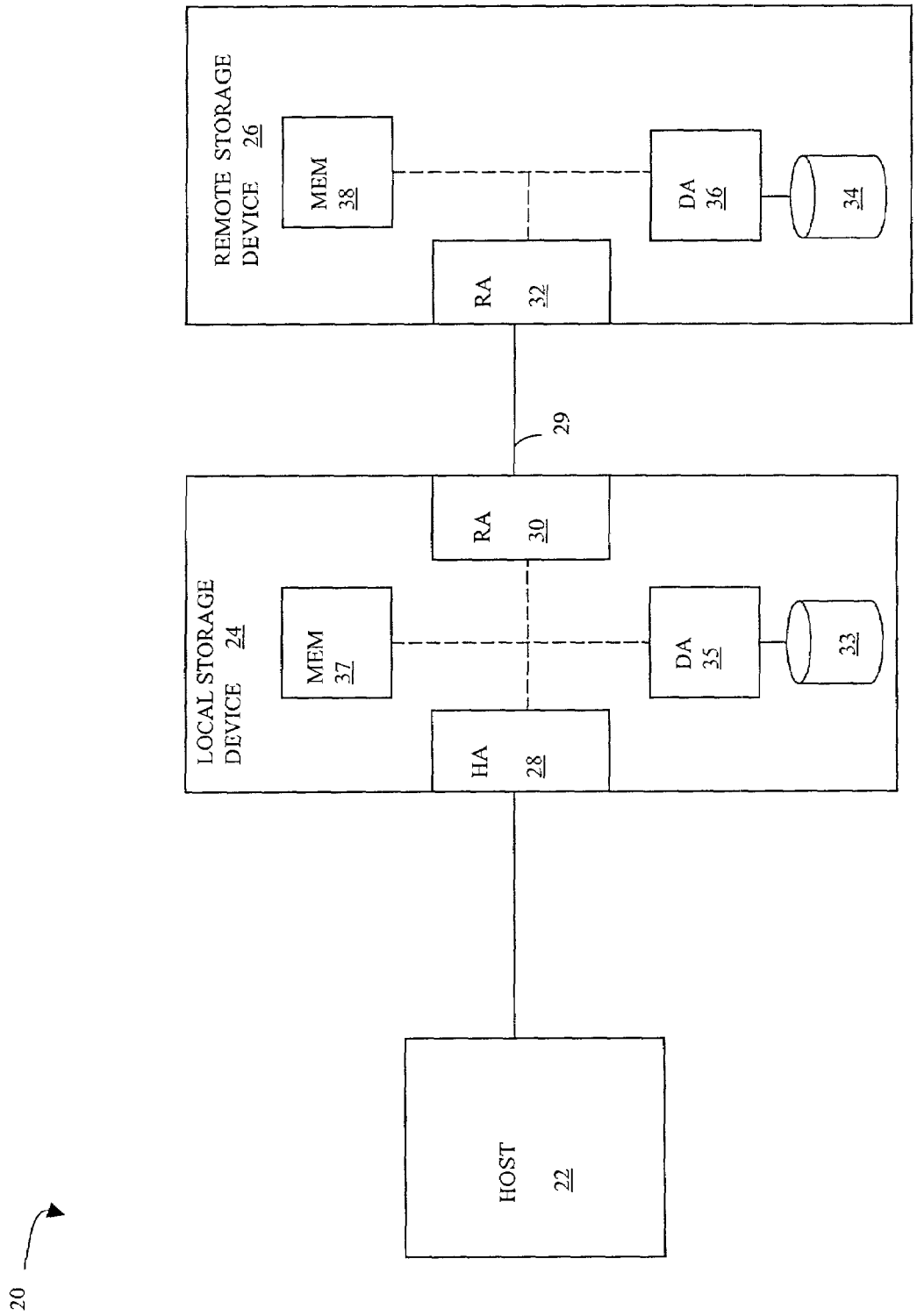
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter 28, which facilitates the interface between the host 22 and the local storage device 24. Data from the local storage device 24 is copied to the remote storage device 26 via an RDF link 29 to cause the data on the remote storage device 26 identical to the data on the local storage device 24. Note that there may be a time delay between the transfer of data from the local storage device 24 to the remote storage device 26 so that the remote storage device 26 may, at certain points in time, contain data that is not identical to the data on the local storage device 24.

The local storage device 24 includes an RDF adapter unit (RA) 30 and the remote storage device 26 includes an RA 32. The RA's 30, 32 are coupled to the RDF link 29 and are similar to the host adapter 28, but are used to transfer data between the storage devices 24, 26. The software used in connection with the RA's 30, 32 is discussed in more detail hereinafter.

The storage devices 24, 26 may include one or more volumes, each containing a different portion of data stored on each of the storage devices 24, 26. FIG. 1 shows the storage device 24 including a volume 33 and the storage device 26 including a volume 34. The RDF functionality described herein may be applied so that the data on the volume 33 of the local storage device 24 is copied, using RDF, to the volume 34 of the remote storage device 26. It is possible that other data of the storage devices 24, 26 is not copied between the storage devices 24, 26 and thus is not identical.

The volume 33 is coupled to a disk adapter unit (DA) 35 that provides data to the volume 33 and receives data from the volume 33. Similarly, a DA 36 of the remote storage device 26 is used to provide data to the volume 34 and receive data from the volume 34. A data path exists between the DA 35, the HA 28 and RA 30 of the local storage device 24. Similarly, a data path exists between the DA 36 and the RA 32 of the remote storage device 26.

The local storage device 24 also includes a memory 37 that may be used to facilitate data transferred between the DA 35, the HA 28 and the RA 30. The memory 37 may contain parameters from system calls, tasks that are to be performed by one or more of the DA 35, the HA 28 and the RA 30, and a cache for data fetched from the volume 33. Similarly, the remote storage device 26 includes a memory 38 that may contain parameters from system calls, tasks that are to be performed by one or more of the DA 36 and the RA 32, and a cache for data fetched from the volume 34. Use of the memories 37, 38 is described in more detail hereinafter.

If the RDF is running properly, then, at steady state, the data on the volume 34 of the remote storage device 26 will be identical to the data on the volume 33 of the local storage device 24. However, it is useful for the host 22 to be able to confirm that this is true by obtaining data from the volume 34 of the remote storage device 26, obtaining data from the volume 34 of the local storage device 24, and then comparing the data to confirm that it is identical. This may be performed in a test that is part of a test suite that may be run periodically (e.g., daily). Such test suites include the ADIOS test suite and the STCMON test suite, provided by EMC Corporation of Hopkinton, Mass.

Figure 2:
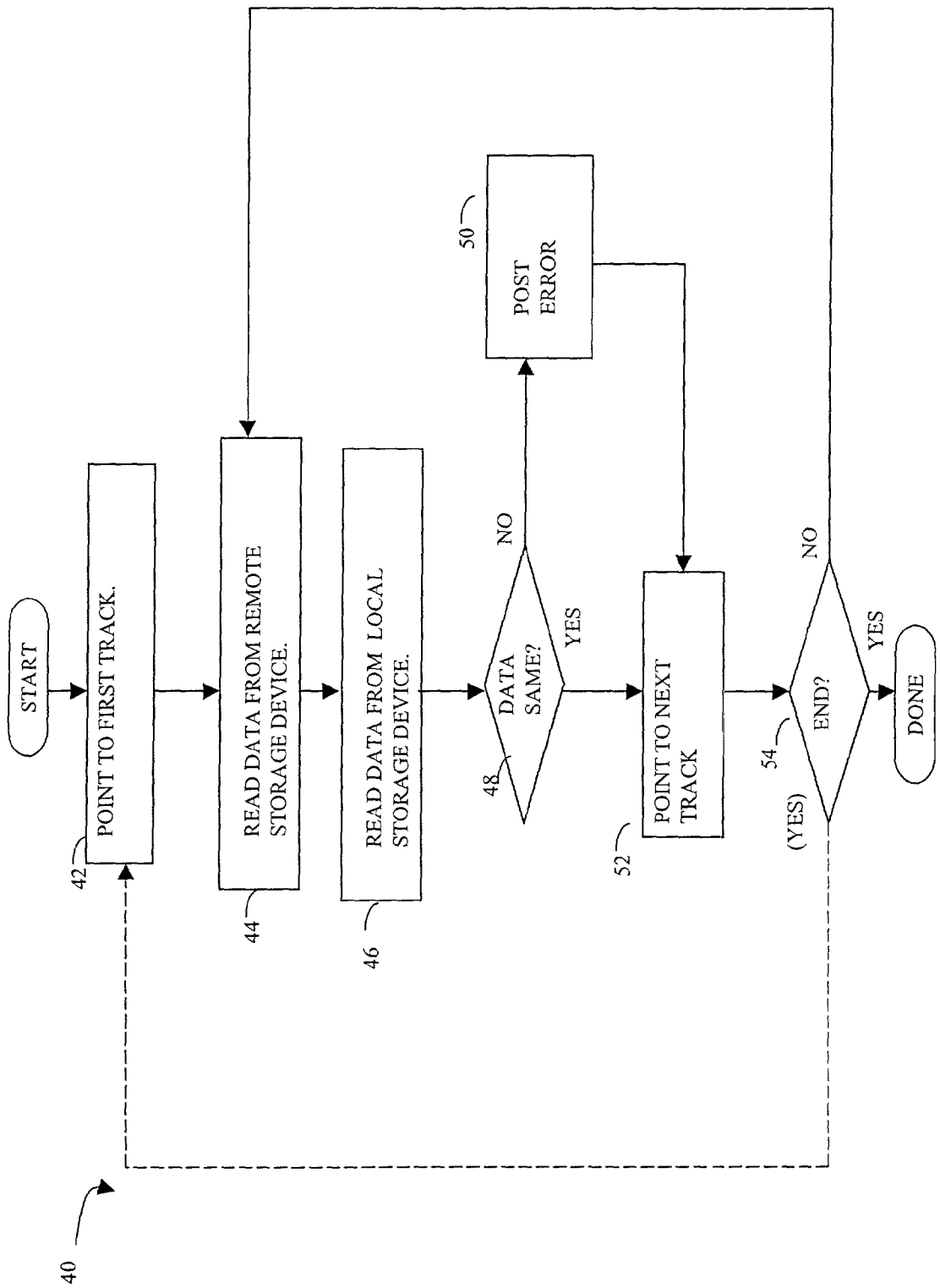
FIG. 2 is a flowchart illustrating steps performed by a program on the host to compare data on the local storage device with data stored on the remote storage device in connection with the system described herein.

Referring to FIG. 2, a flowchart 40 illustrates steps performed by a program that may be ran in the host 22 to verify that the data on the volume 34 of the remote storage device 26 is identical to data on the volume 34 of the local storage device 24. In some embodiments, the program illustrated by the flowchart 40 may be run only when the local storage device 24 and remote storage device 26 are taken offline to perform tests (i.e., not in production). Alternatively, the tests may be performed by reserving exclusive use for volumes under test while the affected storage devices remain in production. For example, the volumes 33, 34 may be compared by reserving the volumes 33, 34 for exclusive use while the storage devices 24, 26 remain in production and handle data for other volumes thereof.

Processing begins at a first step 42 where the first track (or a first portion) of the volumes 33, 34 is selected. The different track numbers refer to corresponding track numbers of both the volumes 33, 34. As discussed herein, a comparison is made by comparing a particular track of the volume 33 of the local storage device 24 with a corresponding track of the volume 34 of the remote storage device 26.

Following the step 42 is a step 44 where the track on the volume 34 of the remote storage device 26 is read. The host 22 reads a particular track on the volume 34 of the remote storage device 26 by making a system call through the local storage device 24 that is passed to the remote storage device 26. The system call is transmitted from the RA 30 to the RA 32 via the RDF link 29 and returns data (via the RDF link 29) from the remote storage device 26 through the local storage device 24 to the host 22. Processing at the step 44 is described in more detail hereinafter.

Following the step 44 is a step 46 where the corresponding track on the volume 33 of the local storage device 24 is read. Following step 46 is a test step 48 where it is determined whether the data is the same. If not, then an error has occurred and control transfers from the step 48 to a step 50 where error processing occurs. The error processing may include, for example, posting the error in an appropriate location and/or providing a message to a user indicating the error and providing additional information, such as the track number, to the user.

If it is determined at the test step 48 that the data for a track (or some other portions of the volumes 33, 34) on the local storage device 24 and the remote storage device 26 is the same, then control passes from the test step 48 to a step 52 where the next track of the volumes 33, 34 is selected for comparison. Note that the step 52 may also be reached following the step 50. Following step 52 is a test step 54 where it is determined if the end has been reached. That is, at the test step 54 it is determined if the mechanism used for pointing to tracks points beyond the last track (or portion) of the volumes 33, 34. If it is determined at the test step 54 that it is not the end, then control passes from the step 54 back to the step 44. Otherwise, processing is complete.

Alternatively, if it is desirable to rerun the comparison program, then, once the track pointer points beyond the last track (or portion) of the volumes 33, 34 at the test step 54, control passes from the step 54 back to the step 42, as illustrated by an alternative path 56.

Note that in some embodiments, the program illustrated by the flowchart 40 may only be performed when the track table indicates that there are no invalid tracks on either of the volumes 33, 34, where invalid tracks are used to indicate that RDF has not yet updated the data for the volume 34 with data that has changed on the volume 33. Alternatively, the program illustrated by the flowchart 40 may be performed when invalid tracks are present by simply skipping comparison of the invalid tracks. In that case, the step 48 would include a test for whether the track being examined is an invalid track and, if so, control would pass from the step 48 to the step 52 so that error processing does not occur.

Figure 3:
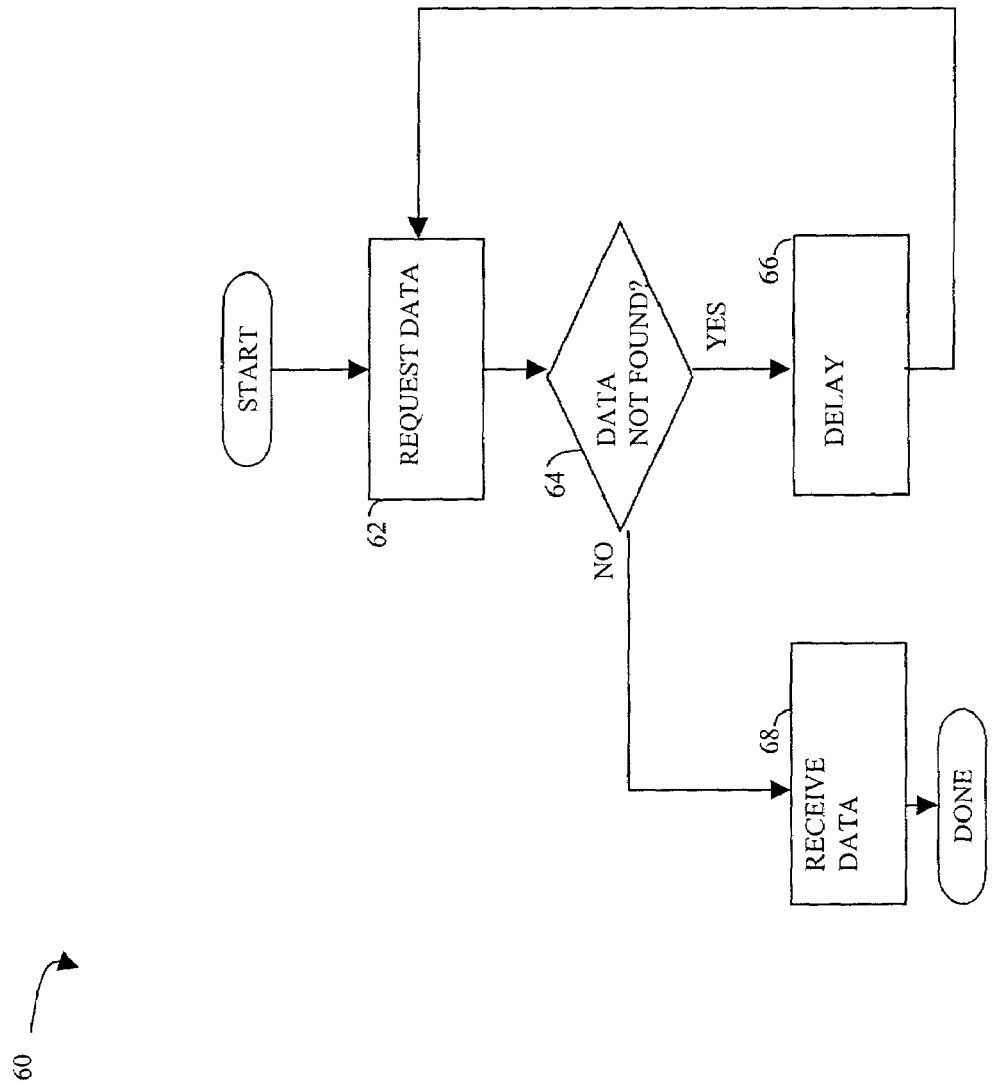
FIG. 3 is a flowchart illustrating steps performed in connection with reading data from a remote storage device.

Referring to FIG. 3, a flowchart 60 illustrates in more detail processing performed in connection with reading data on the volume 34 of the remote storage device 26 at the step 44 of the flowchart 40. Processing begins at a first step 62 where the host sends a read data system call (via the HA 28) to request the data from the remote storage device 26. Following step 62 is a test step 64 to determine if a data_not_found error has been returned. As explained in more detail elsewhere herein, the remote storage device 26 returning a data_not_found error does not necessarily mean that the data is not on the remote storage device 26.

If it is determined at the test step 64 that the data_not_found error has been returned, then control passes from the test step 64 to a step 66 where a delay occurs. The time for the delay is set according to a plurality of functional parameters that will become apparent in connection with the discussion herein. In one embodiment, the delay is 100 milliseconds, although other values for the delay may be appropriate in different situations. Following the delay at the step 66, control passes back to the step 62 to request the data again. As discussed elsewhere herein, it is possible that a second or subsequent request at the step 62 will result in the data being provided by the remote storage device 26.

If it is determined at the test step 64 that the data_not_found error has not been returned, then control passes from the step 64 to a step 68 where the data that is provided by the remote storage device 26 is received. Following the step 68, processing is complete. Note that any other errors that may be returned by the RA 32 are not specifically discussed herein, but may be handled in a conventional manner apparent to one of ordinary skill in the art. Further note that it may be possible to read data from multiple tracks simultaneously so that, for example, the host 22 would make a single request for each of tracks 1-N and then would make subsequent request for data from those tracks. As will be apparent from the remainder of the discussion herein, it is more likely that data will be returned on second and subsequent requests for particular data than on a first request for the data.

Figure 4:
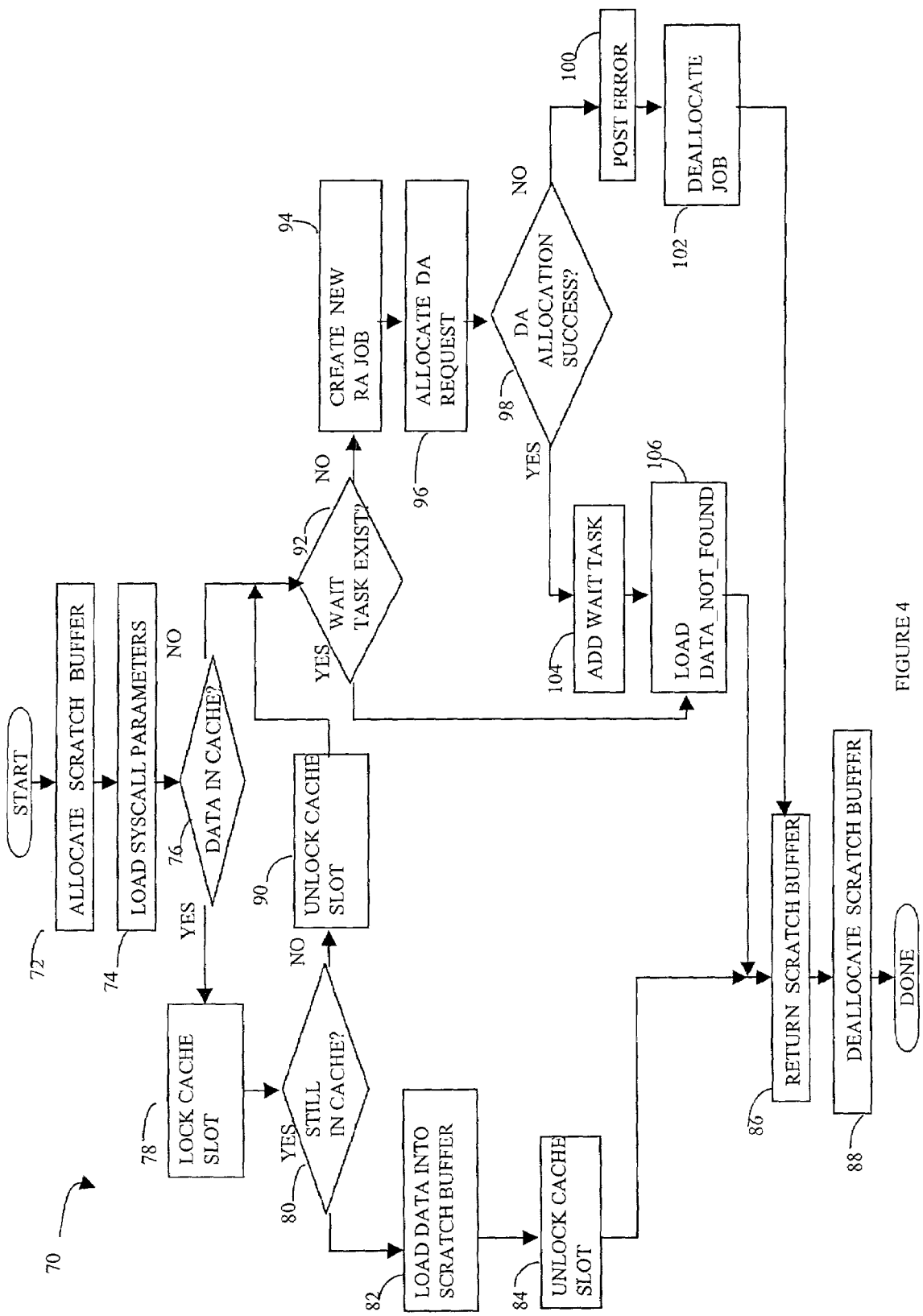
FIG. 4 is a flowchart illustrating steps performed by software running on a remote RA in connection with an embodiment of the system described herein.

Referring to FIG. 4, a flowchart 70 illustrates steps performed by the software of the RA 32 of the remote storage device 26 in response to receipt of a data request system call from the local storage device 24 via the RDF link 29. Processing begins at a first step 72 where a scratch buffer is allocated in the memory 38. The scratch buffer may be used to store parameters from the system call, including parameters provided with the system call as well as any data that is returned in connection with servicing the system call. Following the step 72 is a step 74 where the system call parameters provided by the RA 30 are loaded into the scratch buffer.

Following the step 74 is a test step 76 where it is determined if the requested data is already in the cache portion of the memory 38 of the remote storage device 26. The data may already be in the cache portion of the memory 38 due to, for example, a previous request for the same data. If it is determined at the test step 76 that the data is in the cache, then control passes from the step 76 to a step 78 where the cache slot corresponding to the data is locked. Locking the cache slot prevents the data from being removed from the cache. The data remains in the cache until after the slot is unlocked.

Following the step 78 is a step 80 where it is determined if the requested data is still in the cache. Since the system described herein runs in a multitasking environment, it is possible that the data could have been removed from the cache, by another task, in between the test step 76 and the step 78 where the cache slot was locked. If it is determined at the test step 80 that the data is still in the cache, then control transfers from the step 80 to a step 82 where the data from the cache is loaded into the scratch buffer that was allocated at the step 72. Following the step 82 is a step 84 where the cache is unlocked.

Following step 84 is a step 86 where the data (including any appropriate system parameters) is returned to the local storage device using the RA's 30, 32 and the RDF link 29. Following step 86 is a step 88 where the scratch buffer allocated at the step 72 is deallocated. Following step 88, processing is complete.

If it is determined at the step 80 that the data is not still in the cache after locking the slot at the step 78, then control transfers from the step 80 to a step 90 where the cache slot is unlocked. Following the step 90 is a test step 92. The step 92 is also reached if it is determined at the test step 76 that the data is not in cache. At the step 92, it is determined if a wait task already exists. As discussed in more detail below, a wait task is used to request data from the volume 34 via the disk adapter 36. The wait task waits for the data to be provided from the volume 34. Note that requesting data from the volume 34 will cause the data to be available in the cache once the request has been serviced. The data would then be available in the cache for subsequent read request.

If it is determined at the test step 92 that there is no other wait task waiting for the data, the control transfers from step 92 to step 94 were a new RA, job is created. The RA job is a data structure that is stored locally on the RA 32 and contains information such as the various tasks associated with the job. Following the step 92 is a step 94 where a DA request is allocated on a DA request queue that is stored in the memory 38. A DA request is provided to request the data. The DA 36 (and perhaps other DA's) service the queue by reviewing the requests and performing the services indicated thereby. For the step 96, a request is allocated on the DA queue to request the data from the volume 34 corresponding to the data requested by the system call made to the remote storage device 26.

Following the step 96 is a test step 98 where it is determined is the DA request allocation at the step 96 was successful. If not, then control transfers from the step 98 to a step 100 where an error is posted in a manner similar to that discussed above in connection with other errors. Following the step 100 is a step 102 where the job, created at the step 94, is deallocated. Following the step 102, control transfers to the step 86 where the scratch buffer is returned followed by the step 88, where the scratch buffer is deallocated. Following the step 88, processing is complete. The steps 86, 88 are discussed above.

If it is determined at the step 98 that allocation of the DA request at the step 98 was successful, then control transfers from the step 98 to a step 104 where a wait task is added. The purpose of the wait task is to wait until the DA request allocated at the step 96 is serviced. The wait task is discussed in more detail hereinafter. Following the step 104 is a step 106 where a data_not_found indicator is loaded into the scratch buffer that was allocated at the step 72. The data_not_found indicator is returned by the remote storage device 26 to the local storage device 24 to indicate that the requested data is not being returned. However, as discussed in more detail elsewhere herein, subsequent requests for the data made by the local storage device 24 to the remote storage device 26 are designed to return the data once it has been loaded in the cache portion of the memory 38.

Note that the step 106 is also reached if it is determined at the test step 92 that a wait task exists. The test step 92 is used to ensure that only one wait task per data request is created. Note that if it is determined at the step 92 that a wait task exists, control transfers from the step 92 to the step 106 to place the data_not_found indicator in the scratch buffer, followed by the steps 86, 88 where the data is returned via the RDF link 29 and the scratch buffer is deallocated, as discussed above. Thus, the step 92 is designed to insure that only one wait task is created per data request. Accordingly, a first data request for particular data will result in the step 104 being executed to create the wait task while subsequent requests for the same data that occur before the data is loaded into the cache portion of the memory 38 will cause control to flow from the step 92 to the step 106, omitting the step 104. Following the step 106 are the steps 86, 88, discussed above, where the scratch buffer is returned and then deallocated.

The purpose of the wait task is to request the data from the volume 34. The wait task waits until the data request is fulfilled, and then deallocates the corresponding job and DA request in the queue. Once the data request has been fulfilled, the data will have been read from the volume 34 into the cache portion of the memory 38 using the caching mechanism of the storage device 26. Thus, once the data is in the cache portion of the memory 38, subsequent requests for the data will result in the test step 76 determining that the data is in cache followed by processing where the data is returned from the remote storage 26 to the local storage device 24 via the RDF link 29.

Figure 5:
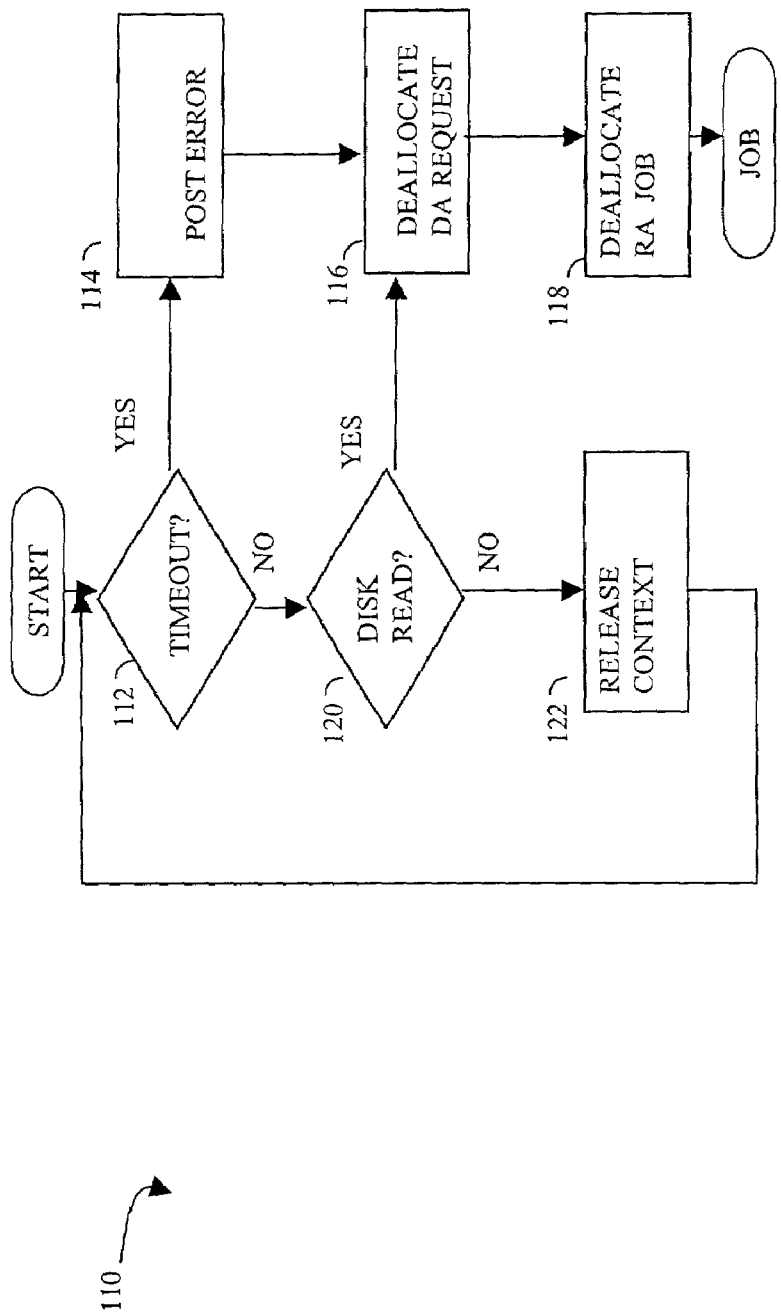
FIG. 5 is a flowchart illustrating steps performed by a wait task running on a remote RA in connection with an embodiment of the system described herein.

Referring to FIG. 5, a flowchart 100 illustrates steps performed in connection with the wait task that is created at the step 86 discussed above in connection with the FIG. 4. Processing begins at a test step 112 which determines if a time out has occurred. If too much time has passed since the wait task was created, then a time out occurs. In some embodiments, the predetermined amount of time is four seconds, although other times may be used. If it is determined at the test step 112 that a time out has occurred, then control passes from the step 112 to a step 114 where the wait task causes an error to be posted. In some embodiments, the error that is provided due a time out is different than the data_not_found result provided in connection with normal operation of the system. Following the step 114 is a step 116 where the DA request allocated at the step 96 of FIG. 4 is deallocated. Following the step 116 is a step 118 where the corresponding RA job, allocated at the step 94 of FIG. 4, is deallocated. Following the step 118, processing is complete.

If it is determined at the step 112 that a time out has not occurred, then control passes from the step 112 to a test step 120 to determine if the disk has been read by, for example, checking an appropriate status location. The step 120 determines if the data request provided to the DA 36 via the DA request allocated at the step 96 of FIG. 4 has been serviced. If it is determined at the test step 120 that the disk has been read, then control flows from the step 120 to the step 116 where the DA request is deallocated.

Following the step 116 is the step 118 where the RA job is deallocated. Following the step 118, processing is complete.

Alternatively, if it determined at the step 120 that the disk has not yet been read, then control transfers from the step 120 to a step 122 where the task releases context. In a multitasking environment, a task may release it's context to allow other tasks to run. The step 122 and subsequent path therefrom represents the wait task releasing it's context in a way so that, when the wait task is swapped back in, execution begins at the step 112.

In some embodiments, it may not be possible or desirable to create the separate wait task illustrated above in connection with FIG. 5. In that case, the request for data is provided from the RA 30 to the RA 32 and, if the request cannot be fulfilled immediately, a temporary disconnect occurs. Then, once the data has been read from the volume 34 into the cache portion of the memory 38 of the remote storage device 26, a reconnect occurs and the data is provided from the RA 32 to the RA 30 via the RDF link 29. This mechanism is discussed in more detail below.

Figure 6:
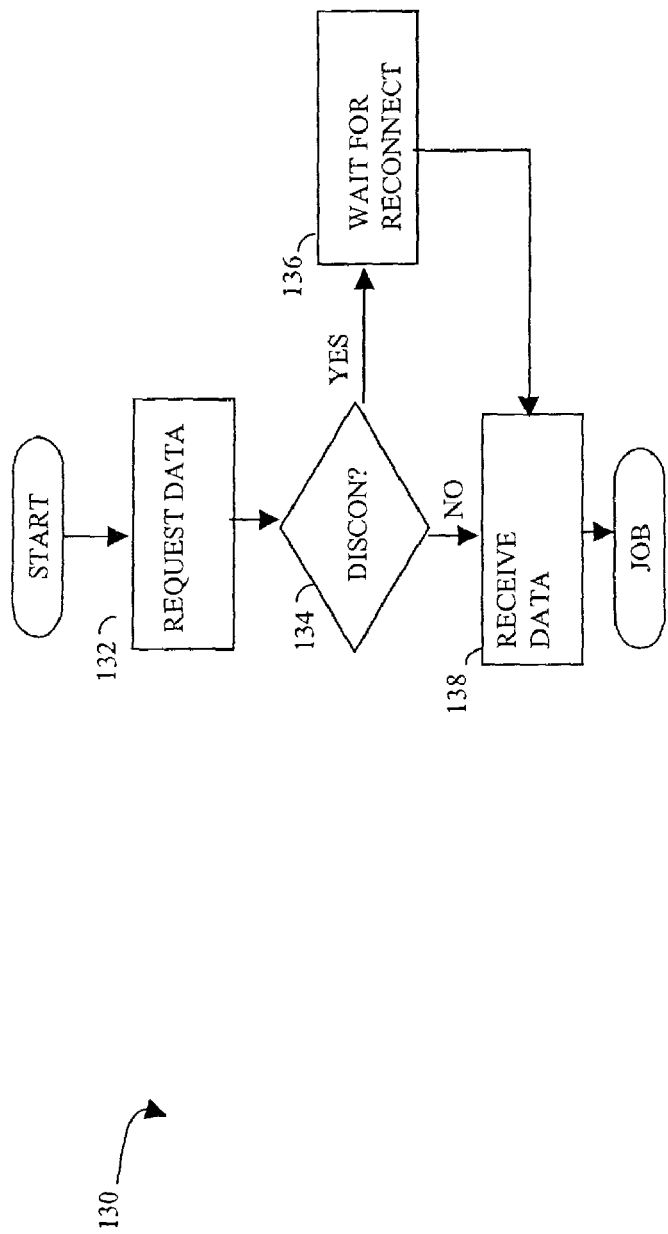
FIG. 6 is a flowchart illustrating steps performed by software running on a requesting RA in connection with an embodiment of the system described herein.

Referring to FIG. 6, a flowchart 120 illustrates steps in connection with requesting data from the volume 34 of the remote storage device 26 in an embodiment where no wait task is used. Processing begins at a first step 132 where the local storage device 24 requests the data from the remote storage device 26 by providing a system call from the RA 30 to the RA 32 via the RDF link 29. Following the step 132 is a test step 134 which determines if a disconnect has occurred. If it is determined at the step 134 that a disconnect has occurred, then control transfers from the step 134 to a step 136 where a wait for a reconnect occurs. A disconnect allows processing for other RDF requests using other devices of the remote storage device 26. Following the step 136 or following the step 134 if no disconnect occurs is a step 138 where the data from the remote storage device 26 is received. Following the step 138, processing is complete.

Figure 7:
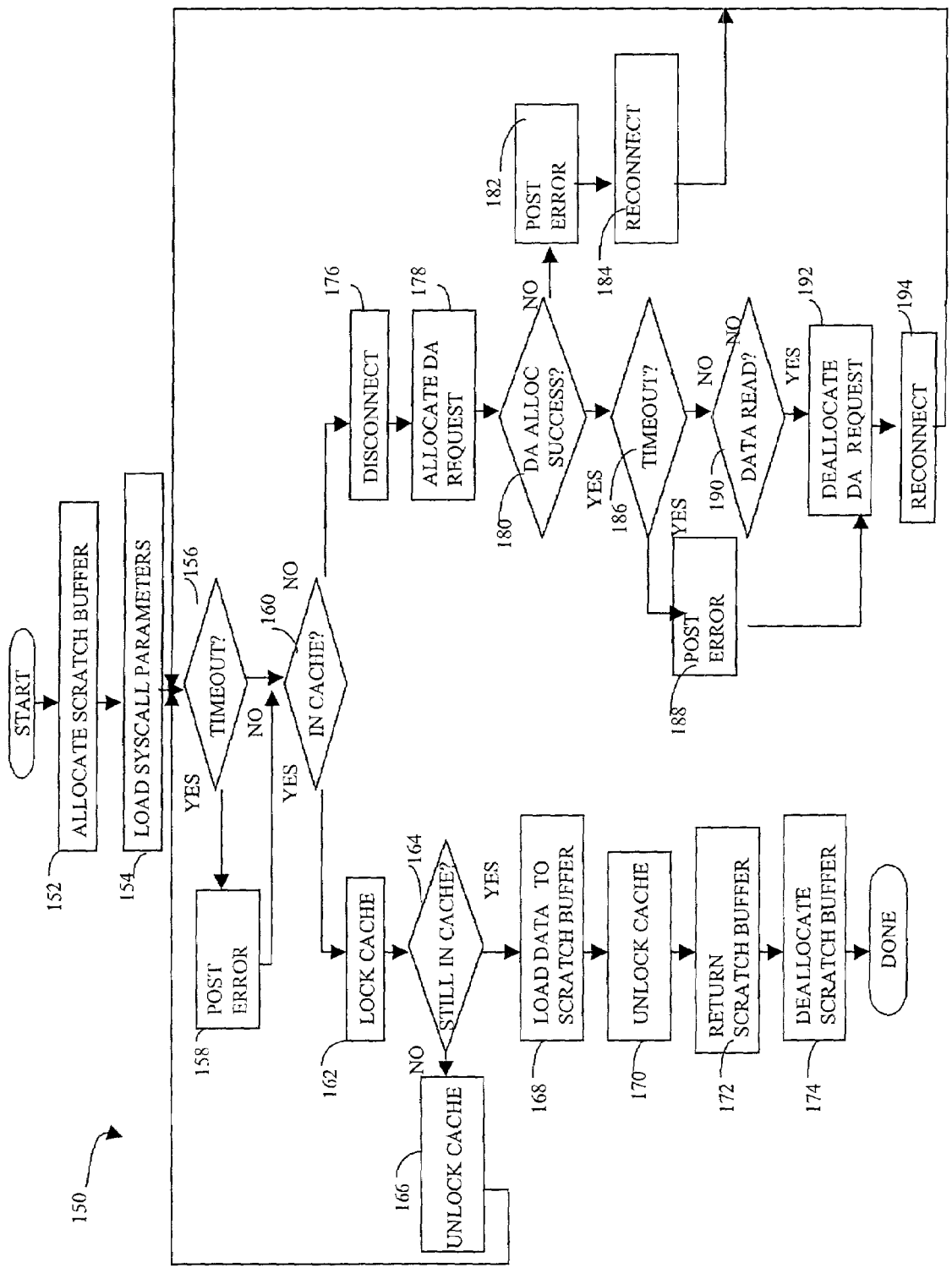
FIG. 7 is a flowchart illustrating steps performed by software running on a remote RA in connection with an embodiment of the system described herein.

Referring to FIG. 7, a flowchart 150 illustrates steps performed by the RA 32 of the remote storage device 26 in connection with a data request system request provided by the local storage device 24 via the RA 30 and the RDF link 29 in an embodiment where a wait task is not created. Processing begins at a first step 152 where a scratch buffer is allocated followed by a step 154 where the parameters from the system call are loaded into the scratch buffer. The steps 152, 154 are analogous to the steps discussed above in connection with the steps 72, 74 of FIG. 4.

Following the step 154 is a test step 156 which determines if a timeout has occurred. A timeout occurs at the step 156 when too much time has elapsed between first invoking the request illustrated by the flowchart 150 and the request being serviced. If it is determined at the step 156 that a timeout has occurred, then control transfers from the step 156 to a step 158 where an error is posted. Following the step 158, or following the step 156 if a timeout has not occurred, is a test step 160 where it is determined if the requested data is in the cache portion of the memory 38. If it is determined at the step 160 that the requested data is in the cache, then control transfer, from the step 160 to a step 162 where the cache slot corresponding to the requested data is locked.

Following the step 162 is a test step 164 where it is determined if the requested data is still in the cache. As discussed above, it is possible in a multitasking environment for the data to have been removed from the cache in between the test step 160 and the locking step 162. If it is determined at the step 164 that the data is not still in the cache, then control transfers from the step 164 to a step 166 where the cache slot is unlocked. Following the step 166, control transfers back to the step 156, discussed above.

If it determined at the step 164 that the data is still in cache, then control transfers from the step 164 to a step 168 where the data from the cache is loaded into the scratch buffer that was allocated at the step 152. Following the step 168 is a step 170 where the cache is unlocked. Following the step 170 is a step 172 where the data (including any appropriate system parameters) is returned to the local storage device using the RA's 30, 32 and the RDF link 29. Following step 172 is a step 174 where the scratch buffer allocated at the step 152 is deallocated. Following step 174, processing is complete.

If it is determined at the step 160 that the data is not in the cache, then control passes from the step 160 to a step 176 where a disconnect occurs. As discussed above, a disconnect allows requests for other devices to be serviced in connection with the RDF link 29. Following the step 176 is a step 178 where a DA request is allocated in a manner similar to that discussed above in connection with FIG. 4. Following the step 178 is a test step 180 where it is determined if the DA allocation at the step 178 was successful. If not, control passes from the step 180 to a step 182 where an error is posted. Following the step 182 is a step 184 where a reconnect occurs. Following the step 184, control flows back to the step 156, discussed above.

If it is determined at the step 180 that the DA request allocation was successful, then control passes from the step 180 to a test step 186 where it is determined if a timeout has occurred. As discussed above in connection with FIG. 5, it may be useful to monitor the time between providing the DA request and the request being serviced. If it is determined at the step 186 that a predetermined amount of time has passed since initiating the request, then control passes from the step 186 to a step 188 where an error is posted. In some embodiments, the predetermined amount of time is eight seconds, although other times may be used.

If it is determined at the step 186 that a timeout has not occurred, then control passes from the step 186 to a step 190 where it is determined if the requested data has been read off the volume 34 by, for example, monitoring appropriate status. If it is determined at the step 190 that the data has not been read, then control passes from the step 190 to a step 192 where the DA request that was allocated at the step 178 is deallocated. Note that the step 192 also follows the step 188. Following the step 102 is a step 194 where a reconnect occurs. Following the step 194, controls flows back to the step 156. Note, however, that at this point, the data would be expected to now be in the cache portion of the memory 38.

In some instances, it may not be desirable to perform a disconnect and a subsequent reconnect, as discussed above. In those cases, the steps 176, 184, 194 may be omitted.

Note that for the system disclosed herein, the host 22 may be a standalone computing device, part of a network, another storage device, a computer having some storage capabilities and/or any device capable of providing the functionality disclosed herein. Similarly, the system disclosed herein may be practiced with any appropriate device used for the local storage device 24, including possibly another computing device, network connection, etc. configured to emulate the local storage device 24 and/or otherwise provide the functionality disclosed herein.

Figure 8:
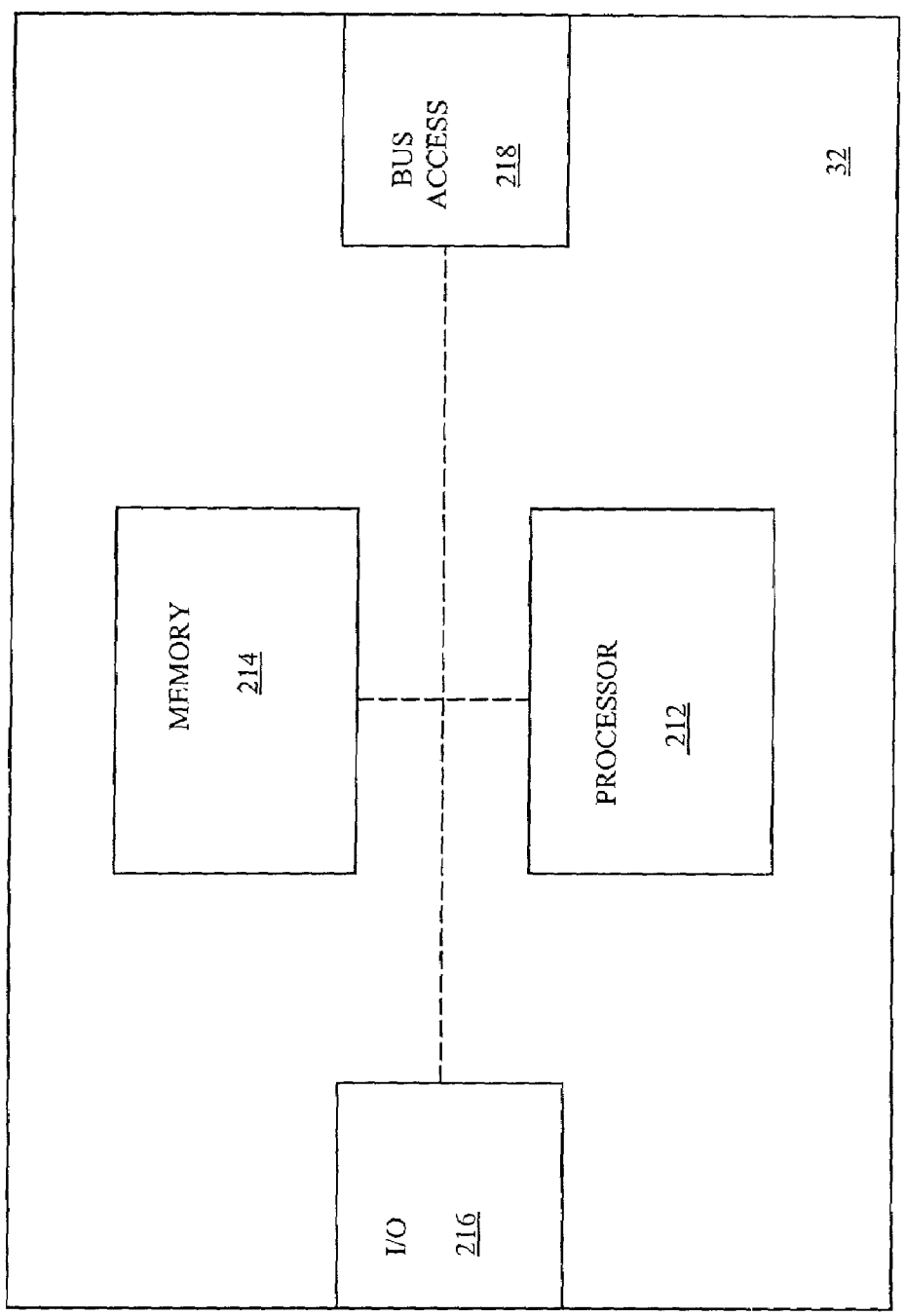
FIG. 8 is a schematic diagram illustrating in more detail the remote RA for the system described herein.

Referring to FIG. 8, the RA 32 of the remote storage device 26 is shown in more detail as containing a processor 212, a memory 214, an I0 interface 216, and a bus access 218. The processor 212 may be a conventional processor that performs the functions for the RA 32 discussed herein. The memory 214 is coupled to the processor 212 and contains local data used by the RA 32. The memory may include volatile portions that are read to and written from by the processor 212 and non-volatile portions that contain data used by the processor 212.

The I/O 216 represents interface circuitry for receiving data for the RA 32 and sending data from the RA 32 via, for example, the RDF link 29. The I/O 216 is coupled to the processor 212 and controlled by the processor 212 in connection with input and output operations. Similarly, the bus access circuitry 218 is also coupled to and manipulated by the processor 212. The bus access circuitry 218 provides access for the RA 32 to the bus of the remote storage device 26 in order to transfer data between the RA 32 and other portions and devices of the remote storage device 26, such as the memory 38.

The RA 32 causes input and output operations to be performed on the volume 34 in connection with transferring data to and from the remote storage device 26. The RA 32 accomplishes this by creating a plurality of jobs, which are data structures stored in the memory 214 that describe the input/output operation to be performed on the device 34 or on other devices or volumes (not shown) of the remote storage device 26. The creation, manipulation, and structure of the jobs is discussed in more detail below.

Figure 9:
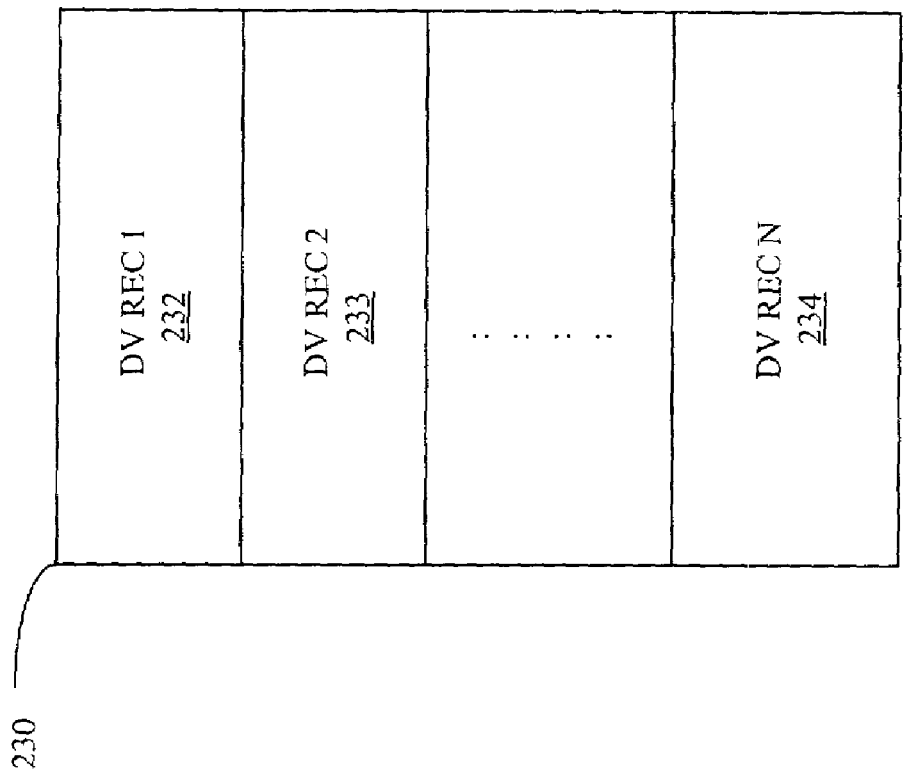
FIG. 9 is a diagram illustrating an array of device records for the system described herein.

Referring to FIG. 9, an array of device records 230 includes a first device record 232, a second device record 233, and an Nth device record 234. The array of device records 230 contains a slot for each possible device (volume) of the remote storage device 26. Thus, for example, a specific one of the device records 232-234 will represent the device 34 of the remote storage device, while other ones of the device records 232-234 will represent other devices (volumes) of the remote storage device 26. For devices that are not accessed by the RA 32 and for devices that are simply not present on the remote storage device 26, the corresponding device record in the array 230 may contain a suitable indicator, such as null, indicating that the device is not accessed by the RA 32. Otherwise, for devices accessed by the RA 32, the corresponding device record will contain data for the device, as described in more detail below.

Figure 10:
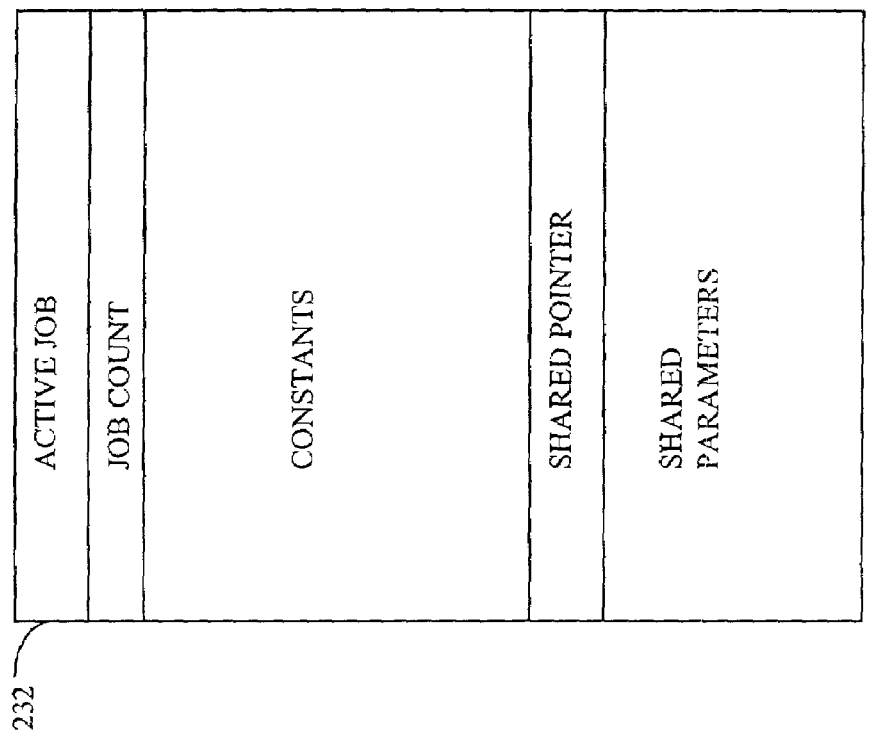
FIG. 10 is a diagram illustrating in more detail a device record for the system described herein.

Referring to FIG. 10, a device record 232 is shown in more detail. The device record 232 includes an active job pointer, a job count, an area for constants, a shared pointer, and shared parameters. The active job pointer points to the job that is currently active for the device. The job counter indicates the number of jobs that have been created for the device. The constants includes a plurality of constant variables that are specific to the device. The shared pointer points to the device record. And the shared parameters represent variables that are potentially volatile, but which may be changed on a per device, rather than per job, basis. The fields of the device record 232 are discussed in more detail below.

Figure 11:
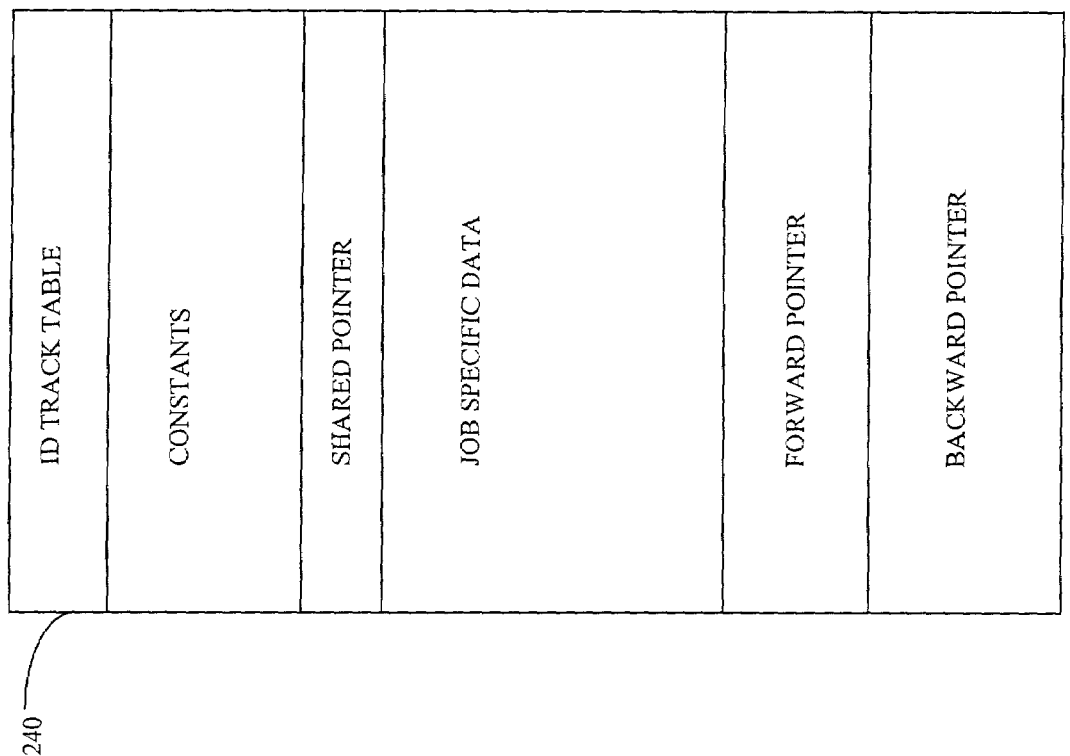
FIG. 11 is a diagram illustrating in more detail a job record for the system described herein.

Referring to FIG. 11, a job record 240 is illustrated in detail. Each job that is created includes a track ID table for the corresponding device, an area for constants, a shared pointer, job specific data, a forward pointer, and a backward pointer. The track ID table represents the track ID for the particular device (volume) that corresponds to the job and the particular tracks being accessed in connection with the job. The constants correspond to the constants found in the device record 232 and represent device specific constants. At least a part of the constants of the job record 240 may be a copy of the constants of the device record 232. The shared pointer points back to the corresponding device record, as described in more detail below. The job specific data represents data that relates to the specific job, such as the state of the job. The forward pointer and backward pointer are used to create a doubly linked list of jobs for each device, described in more detail below. Thus, if the device 34 had four jobs associated therewith, there would be four, somewhat different, instances of the job record 240 all linked together by the forward and backward pointer fields.

Figure 12:
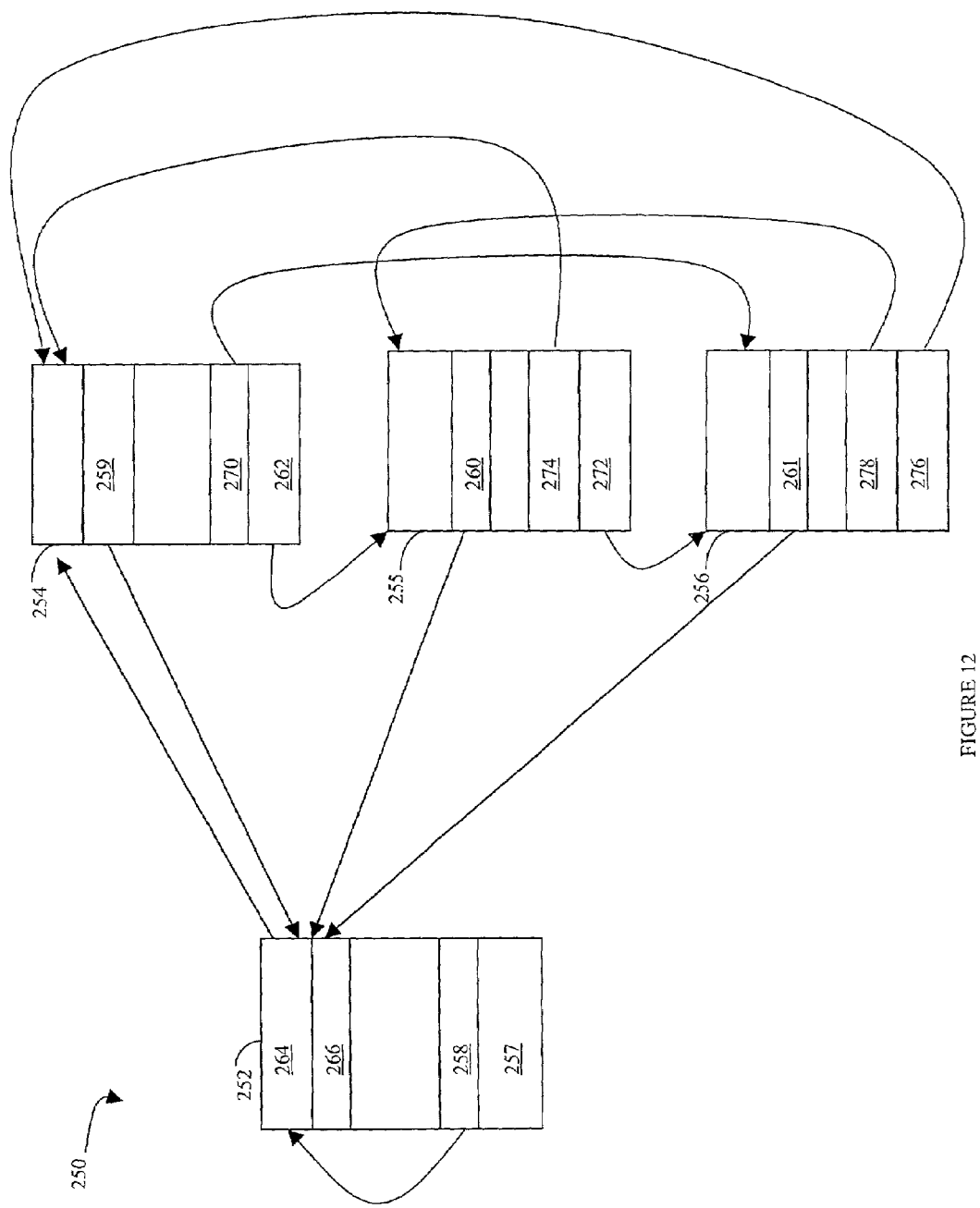
FIG. 12 is a diagram illustrating in more detail a relationship between a device record and multiple corresponding job records for the system described herein.

Referring to FIG. 12, a diagram 250 illustrates relationship between a device record 252 and a plurality of corresponding job records 254-256. The device record 252 contains a shared pointer 258. The job records 254-256 also contain respective shared pointers 259-261. Note that, in all instances, all of the shared pointers 258-261 point back to the device record 252. Thus, the device record 252, and any parameters thereof, may be referenced either from the device record itself 252 or from any one of the job records 254-256 using the shared pointers 258-261.

The device record 252 includes an active job pointer 264 that points to the job 254, which for purposes of the discussion herein, is deemed the active job. In effect, the active job pointer 264 points to one of the job records 254-256 in order to allow access to the job records 254-256 since, as discussed in more detail below, the job records 254-256 are linked together by a doubly linked list. The device record 252 also includes a job counter 266 that indicates how many jobs 254-256 have been created. In this instance, the job counter 266 would contain the number three.

The job record 254 includes a forward pointer 268 and a backward pointer 270. In the example shown herein, the forward pointer 268 points to the job record 255 while the backward pointer 270 points to the job record 256. Similarly, the job record 255 includes a forward pointer 272 that points to the job record 256 and a backward pointer 274 that points to the job record 254. In addition, the job record 256 includes a forward pointer 276 that points to the job 254 and a backward pointer 278 that points to the job 255. Accordingly, it would be possible to traverse all of the jobs 254-256 associated with the device record 252 by starting at the active job pointer 264 of the device record 252 and counting through the number of jobs indicated by the job counter 266 of the device record 252. The traversal may be in one direction using the forward pointers 268, 272, 276, or in another direction by using the backward pointers 270, 274, 278.

The device record 252 contains a portion for shared data 257 that contains device specific volatile data that may be modified in the course of accessing a device. For example, the shared section 257 may contain data indicating that a particular device is ready or not ready. The shared section 257 may be accessed from either the device record 252 or any one of the job records 254-256 using any one of the shared pointers 258-261.

The job records 254-256 may be provided in the memory 38 of the remote storage device 26. In that way, the jobs may be serviced by the DA 36 or by another appropriate device within the remote storage device 26, including possibly the RA 32.

Figure 13:
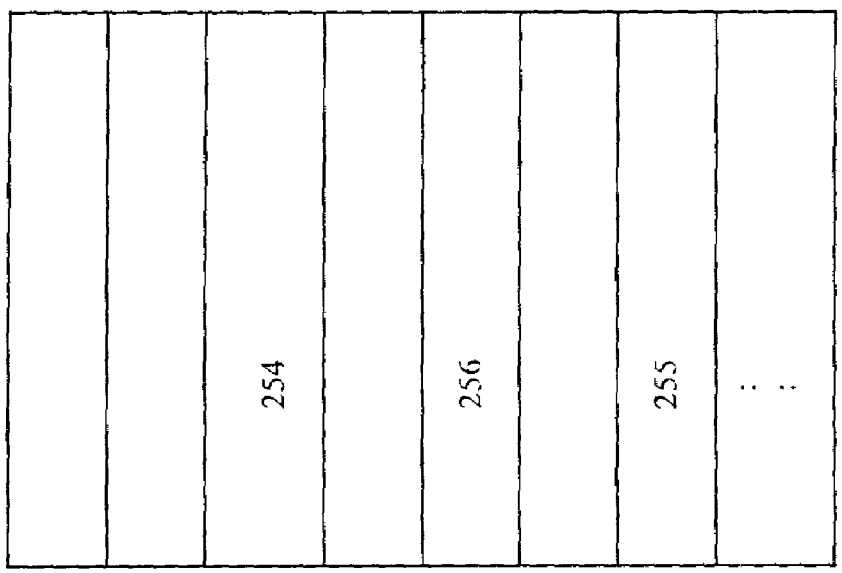
FIG. 13 is a diagram illustrating an array for storing job records for the system described herein.

Referring to FIG. 13, a single array 280 may be used to store job records. The job records in the array 280 may correspond to more than one device (volume) and there is not necessarily any relationship between the location of a job record in the array 280 and the ordering of job records in the doubly linked list for job records (discussed above) or which devices correspond to which job records. The array 280 is simply a location to store all of the job records for the RA 32. When a job record is created, the first free element of the array 280 that is found is used. When the job corresponding to a job record completes and is no longer needed, the element of the array 280 is marked as being free for creation of another job record. This may be done by either having a separate data element that indicates which elements of the array 280 are free, by having a field (bit) in each element of the array 280 that is appropriately marked (set), or by other means familiar to one of ordinary skill in the art.

Communication between the RA 32 and another RA (such as the RA 30 of the local storage device 24) is initiated by the primary device (i.e., the device initiating the remote storage connection). For example, if data stored by the host 22 on the volume 33 of the local storage device 24 is to be mirrored on to the volume 34 of the remote storage device 26, then the operation would be initiated by the RA 30 of the local storage device 24. The RA 30 would be the primary device. Data transfer commands between the RA's 30, 32 include a link id, which is used by the RA's 30, 32 to uniquely identify the job on the secondary RA that handles the data transfer. For example, a command may be initially provided by the RA 30 (primary in this example) to the RA 32 (secondary in this example) to begin the data transfer process and establish a link. The command from the RA 30 includes a special, invalid, link id that indicates that a new link id (and new job record) needs to be created. In response, the RA 32 would create a new job and return a new link id to be used by the RA 30 for subsequent commands in connection with the data transfer.

Figure 14:
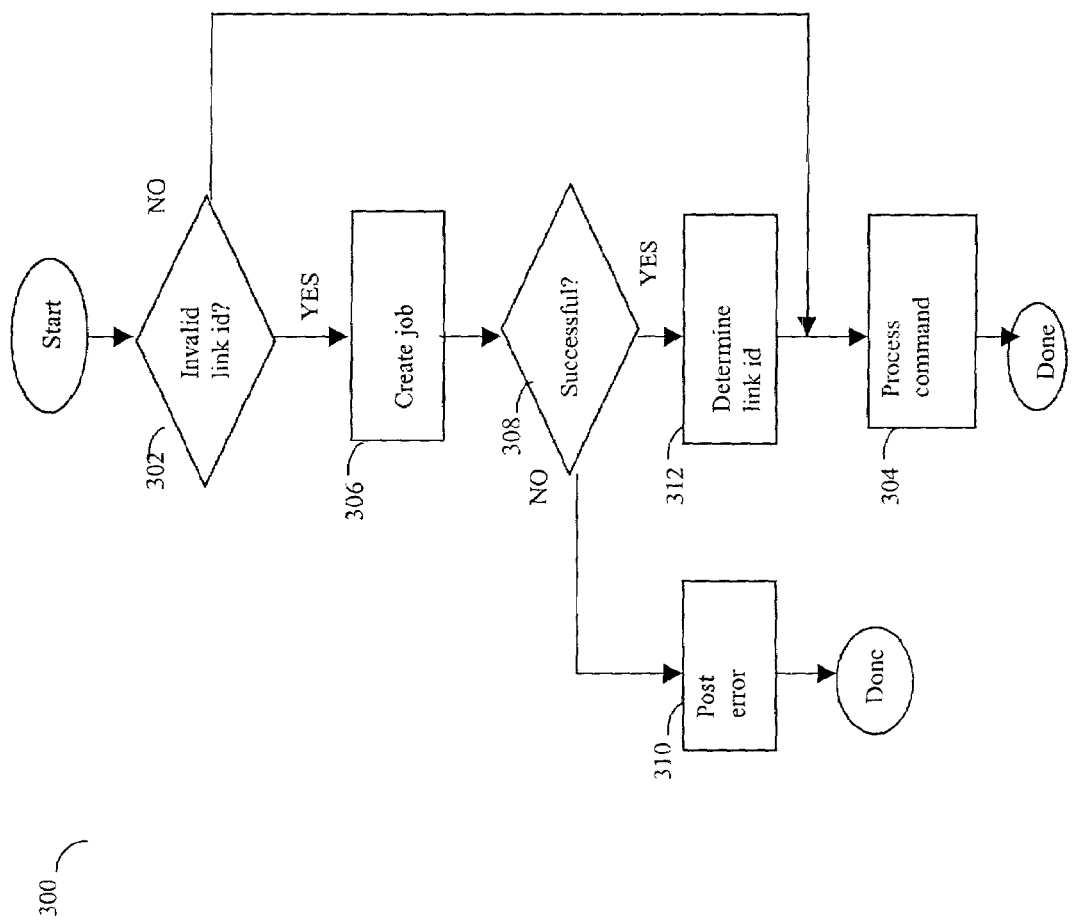
FIG. 14 is a flowchart illustrating steps performed by a secondary RA in connection with communication between a primary RA and a secondary RA for the system described herein.

Referring to FIG. 14, a flowchart illustrates steps performed by the secondary RA in connection with communication between a primary RA and a secondary RA. Processing begins at a first step 302 where it is determined if the primary RA has provided an invalid link id indicating that a new link id is to be created along with a new job record. If it is determined at the test step 302 that the primary RA has not provided an invalid link id (i.e., the primary RA has provided a valid link id for an established connection), then control transfers from the step 302 to a step 304 where the command is processed in the usual fashion (e.g., data transfer) with the already established link. Following the step 304, processing is complete.

If it is determined at the step 302 that the primary RA has provided an invalid link id indicating that a new link id is to be created along with a new job record, then control transfers from the step 302 to a step 306 where a new job is created. Creation of a new job at the step 306 is described in more detail below. Following the step 306 is a test step 308 where it is determined if a job was successfully created at the step 306. If not, then control transfers from the step 308 to a step 310 where an error is posted. Posting errors is discussed elsewhere herein. Following the step 310, processing is complete.

If it is determined at the step 308 that a job was successfully created at the step 306, then control transfers from the step 310 to a step 312 where a link id is determined. In one embodiment, the link id is a combination of a unique identifier for the secondary storage device and the index of the job record in the array 280 (described above). For example, the link id could be a two byte value where the first byte equals the unique identifier of the secondary storage device and the second byte equals the index of the job record in the array 280.

Figure 15:
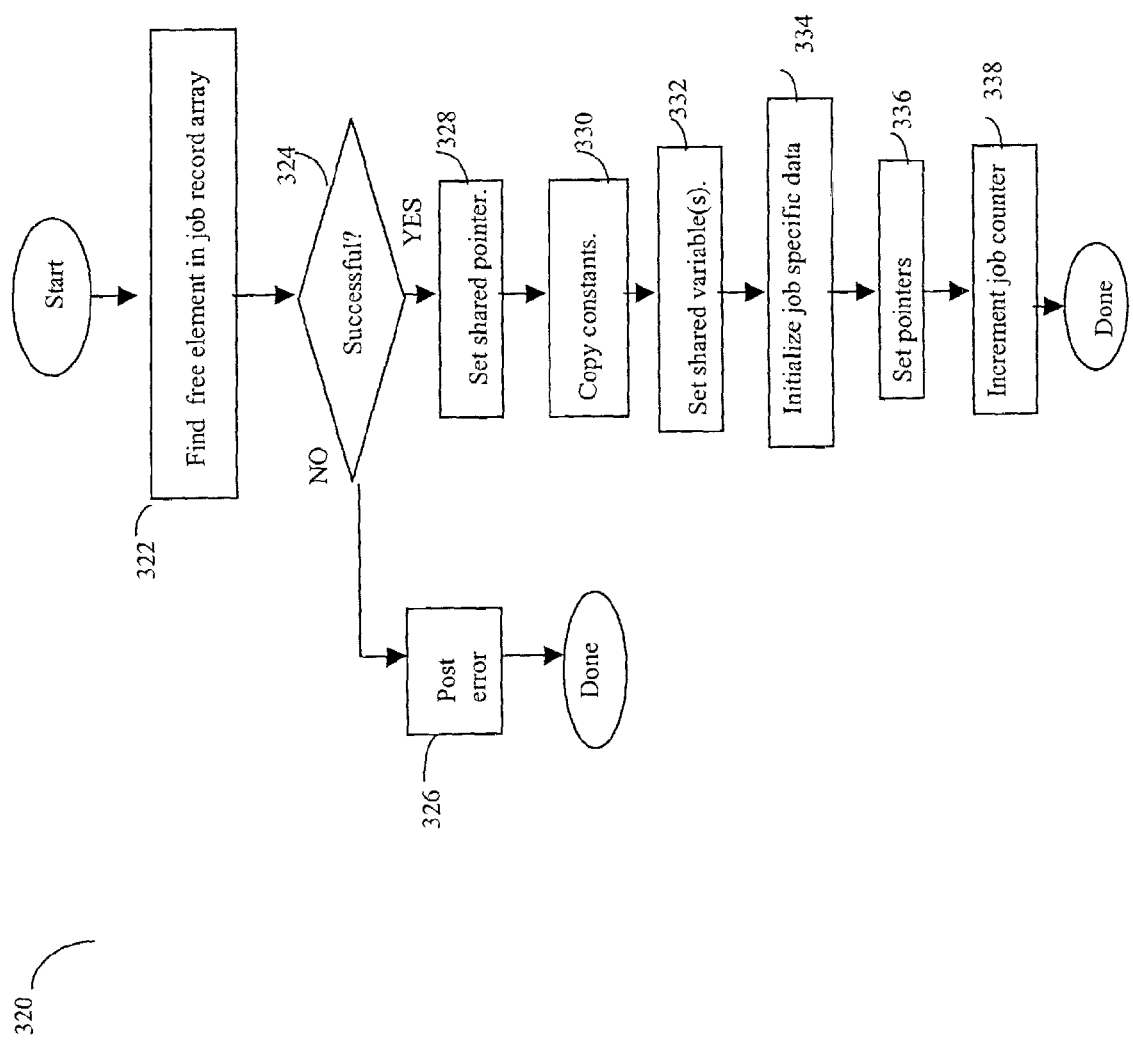
FIG. 15 is a flow chart illustrating steps performed in connection with creation of a new job for the system described herein.

Referring to FIG. 15, a flow chart 320 illustrates steps performed in connection with creation of a new job. Processing begins at a first step 322 where a free element in the job record array 280 is found. Following the step 322 is a test step 324 where it is determined if the operation at the step 322 was successful (i.e., if a free element was available). If not, then control transfers from the step 324 to a step 326 where an error is posted. Posting of errors is discussed elsewhere herein. Following the step 326, processing is complete.

If it is determined at the step 324 that the operation at the step 322 was successful, then control transfers from the step 324 to a step 328 where the shared pointer of the new job record is set to point to the corresponding device record, as discussed above. Following the step 328 is a step 330 where the constants from the device record corresponding to the new job record are copied to the new job record. Following the step 330 is a step 332 where any of the shared variables for the device record corresponding to the new job record that need to be modified are set. Note that there may be no shared variable that need to be modified at the step 332. Following the step 332 is a step 334 where job specific data for the new job record is initialized. Following the step 334 is a step 336 where the forward and backward pointers of the new job record, as well as the forward and backward pointers of existing job records, are set to include the new job record in the doubly linked list. Following the step 336 is a step 338 where the job counter for the device record corresponding to the new job is incremented to indicate that a new record has been added. Following the step 338, processing is complete.

While the invention has been disclosed in connection with various embodiments, modifications thereon will be readily apparent to those skilled in the art. Accordingly, the spirit and scope of the invention is set forth in the following claims.

What is claimed is:

1. A method of providing multiple jobs for a first communication device that exchanges data with a second communication device, comprising:
   providing a plurality of device records, wherein each of the device records corresponds to the first communication device;
   providing a plurality of job records for at least one of the device records as a corresponding device record, wherein each of the job records contains at least some information that is also provided in the corresponding device record, and wherein at least one of the job records corresponds to tasks performed in connection with exchanging data between the first communication device and the second communication device;
   linking the job records and the corresponding device record;
   accessing any one of the job records by first accessing the corresponding device record, wherein jobs corresponding to the job records associated with the corresponding device record are serviceable by different adapters that access the corresponding device record, and wherein at least one of the jobs is serviced by one of the different adapters accessing a particular job record for the at least one of the jobs via accessing the corresponding device record, the different adapters that access the corresponding device record being linked to the particular job record corresponding to the at least one of the jobs, and then the one of the different adapters servicing the at least one of the jobs; and
   providing one of a plurality of shared pointers in each of the job records and the corresponding device record, wherein all of the shared pointers point to the corresponding device record.

2. The method, according to claim 1, wherein linking the job records includes providing a forward pointer and a backward pointer for each of the job records.

3. The method, according to claim 2, wherein linking the job records also includes providing a pointer to one of the job records in the corresponding device record.

4. The method, according to claim 1, wherein at least one of the device records includes a pointer to one of the job records corresponding to an active job.

5. The method, according to claim 1, wherein each of the job records includes information not found in other ones of the job records.

6. The method of claim 1, wherein the first communication device is included in a remote data storage system which communicates with a local data storage system including the second communication device, a request from said local data storage system using the second communication device causing creation of one of said job records in said remote data storage system.

7. Computer software, stored on a computer-readable storage medium and executable by at least one processor, that provides multiple jobs for a first communication device that exchanges data with a second communication device, comprising:
- executable code that provides a plurality of device records, wherein each of the device records is associated with the first communication device;
- executable code that provides a plurality of job records for at least one of the device records as a corresponding device record, wherein each of the job records contains at least some information that is also provided in the corresponding device record, and wherein at least one of the job records corresponds to tasks performed in connection with exchanging data between the first communication device and the second communication device;
- executable code that links the job records and the corresponding device record;
- executable code that accesses any one of the job records by first accessing the corresponding device record, wherein jobs corresponding to the job records associated with the corresponding device record are serviceable by different adapters that access the corresponding device record, and wherein at least one of the jobs is serviced by one of the different adapters accessing a particular job record for the at least one of the jobs via accessing the corresponding device record, the different adapters that access the corresponding device record being linked to the particular job record corresponding to the at least one of the jobs, and then the one of the different adapters servicing the at least one of the jobs; and
- executable code that provides one of a plurality of shared pointers in each of the job records and the corresponding device record, wherein all of the shared pointers point to the corresponding device record.

8. The computer software, according to claim 7, wherein the executable code that links the job records includes executable code that provides a forward pointer and a backward pointer for each of the job records.

9. The computer software, according to claim 8, wherein the executable code that links the job records also includes executable code that provides a pointer to one of the job records in the corresponding device record.

10. The computer software, according to claim 7, wherein at least one of the device records includes a pointer to one of the job records corresponding to an active job.

11. The computer software, according to claim 7, wherein each of the job records includes information not found in other ones of the job records.

* * * * *

UNITED STATES PATENT AND TRADEMARK OFFICE
CERTIFICATE OF CORRECTION

PATENT NO. : 7,577,957 B1  Page 1 of 1
APPLICATION NO. : 09/891143
DATED : August 18, 2009
INVENTOR(S) : Kamvysselis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Seventh Day of September, 2010

David J. Kappos
*Director of the United States Patent and Trademark Office*